UNITED STATES PATENT OFFICE.

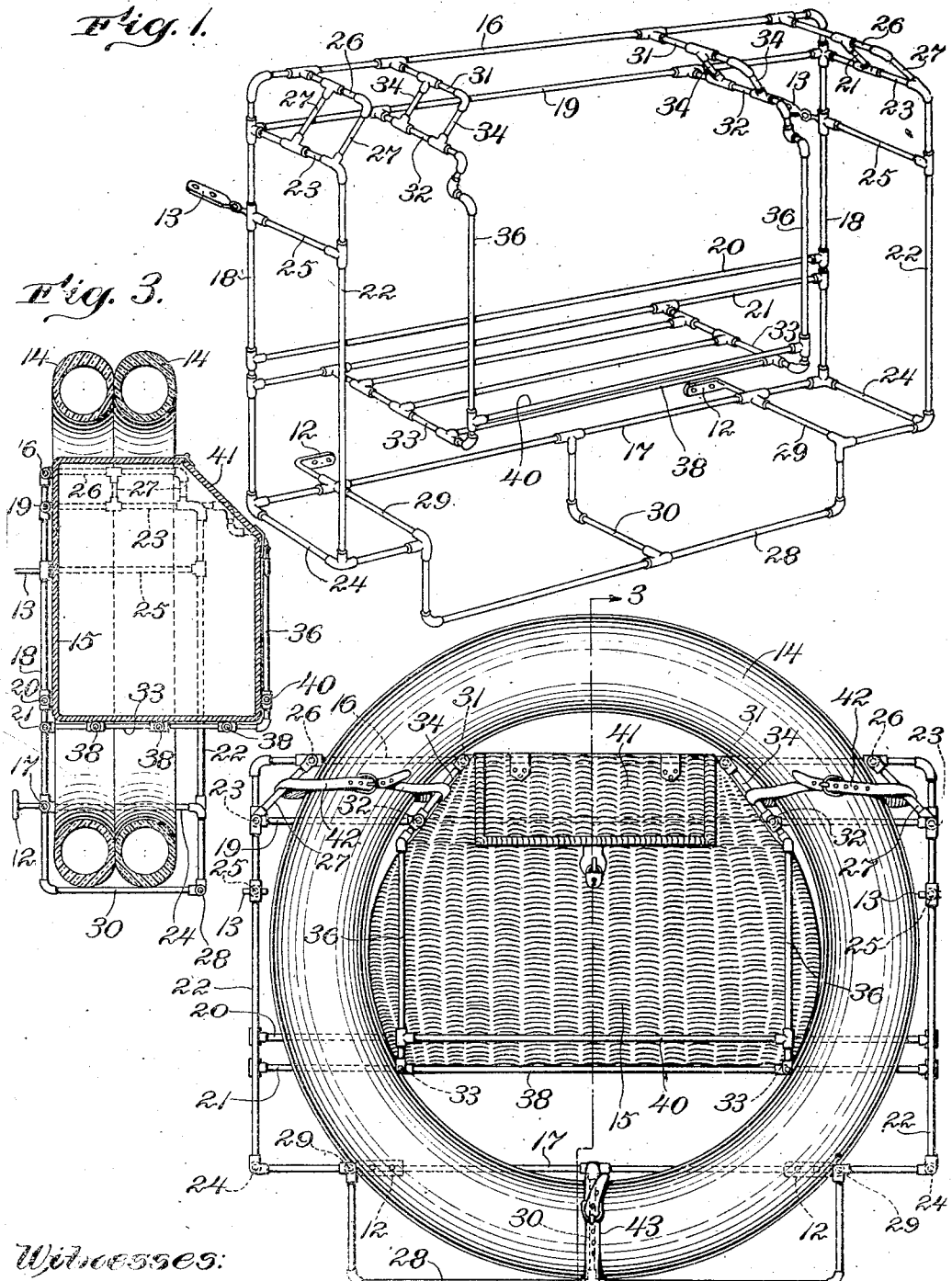

JOSEPH J. BOND, OF READING, MASSACHUSETTS.

TIRE AND LUGGAGE CARRIER FOR AUTOMOBILES, &c.

No. 879,511.　　　　Specification of Letters Patent.　　　Patented Feb. 18, 1908.

Application filed March 20, 1907. Serial No. 363,466.

*To all whom it may concern:*

Be it known that I, JOSEPH J. BOND, of Reading, in the county of Middlesex and State of Massachusetts, have invented certain new and useful Improvements in Tire and Luggage Carriers for Automobiles, &c., of which the following is a specification.

This invention has for its object to provide a carrier adapted to be attached to the body of an automobile, and to hold one or more spare tires and a box-like receptacle for miscellaneous articles, the said receptacle being contained within the space which accommodates the tires, so that the opening surrounded by the tires, instead of being waste or unutilized space, as heretofore, is utilized for storage purposes, the result being that both the spare tires and the crate, basket or box usually carried on an automobile, are all contained in the space heretofore monopolized entirely by the spare tires.

The invention consists in the improved carrier which I will now proceed to describe and claim.

Of the accompanying drawings, forming a part of this specification—Figure 1 represents a perspective view of a carrier embodying my invention. Fig. 2 represents a side view of the carrier with the tires and receptacle installed in the same. Fig. 3 represents a section on line 3—3 of Fig. 1.

The same letters of reference indicate the same parts in all the figures.

In carrying out my invention I construct a carrier which is provided with suitable means for attachment to any suitable support, such as an automobile body, the attaching means here shown comprising ears 12 12 and 13 13 projecting from the back of the frame, and adapted to be attached by screws or otherwise to the vehicle body. The frame may be of any suitable form and construction which will provide supports for one or more spare tires 14, and will permit the same to be securely held, and will also provide for the accommodation and secure holding of a receptacle 15 within and surrounded by the space occupied by the tires. In the embodiment of my invention here shown, the frame is composed of straight metal rods and suitable elbows, joints and couplings, whereby the rods are connected to form a cage. The back of the cage, as here shown, comprises top and bottom horizontal members 16 17 and end members 18 18 united to form a substantially rectangular frame which constitutes the back or base portion of the carrier, the end members 18 being preferably connected by intermediate horizontal members 19 20 and 21. The ends of the cage are formed by the members 18 and by front vertical end members 22 22, which are connected with the rear members 18 by transverse top and bottom members 23 24 and an intermediate transverse member 25, the ends of the frame being preferably supplemented by inclined wing portions formed by transverse members 26, attached to the upper horizontal member 16, and inclined members 27 extending from the transverse members 26 to the upper transverse members 23. The bottom of the cage is composed of a horizontal member 28, which is preferably offset at its end portions, and attached to the lower ends of the front vertical members 22, transverse members 29 29 being preferably provided to connect the upper angles of the offset member 28 with the lower horizontal offset member 17. The frame, constructed as above described, is open or unobstructed at its front side, so that the tires 14 may be readily inserted from the front side, the inner tire coming to a bearing against the back of the frame, and the outer periphery of the tire being supported against edgewise displacement by the transverse members 23 26 and 29, as shown in Fig. 2. The central portion of the offset member 28 is preferably connected with the lower horizontal frame member 17 by an angular transverse member 30, the latter supporting the bottom portions of the tires.

A compartment is provided between the ends of the cage for holding and securing the receptacle 15, said compartment being composed, in this embodiment of my invention, of two end portions and a bottom portion. Each of the end portions is composed of an upper transverse member 31 attached to the upper frame member 16, a transverse member 32 attached to the intermediate frame member 19, and a lower transverse member 33 attached to the intermediate member 21. The member 31 is connected by inclined members 34 with the transverse member 32, and the said member 32 is connected by a suitable angular connection 35 with a vertical member 36, the lower end of the latter being connected with the lower transverse member 33. The ends of the receptacle compartment being thus provided, the bottom of said compartment is formed by horizontal members 38, of which three are here shown extending across the space between the lower transverse members 33 33, and suitably connected thereto. The receptacle 15 rests on the bottom members 38, its upper portion being located between the transverse members 32 32, and prevented from endwise displacement thereby. Sidewise forward and backward displacement of the receptacle is prevented by the intermediate frame members 19 and 20 and the top frame member 16, these bearing on the back of the receptacle, as shown in Fig. 3, and by a horizontal front member 40 extending between the vertical members 36, and attached thereto, said member 40 bearing on the front side of the receptacle.

The receptacle 15 may be of any suitable form, construction and material. I have here shown the receptacle as composed of interwoven members forming a basket, the ends of which are preferably curved to conform approximately to the curvature of the inner periphery of the tire or tires, the basket having an opening in its upper portion guarded by a hinged cover 41. It will be seen that the above-described receptacle compartment or holder projects outwardly from the back of the carrier, and is surrounded by a tire-receiving space, which is unobstructed at the front of the carrier, and is closed or obstructed by the back of the carrier; that is to say, by the horizontal members of the back, the same extending across said space, and forming, collectively, an abutment or bearing for the inner side of the inner tire 14 inserted in said space. The tire-receiving space is open or unobstructed at the front of the carrier, so that a tire can be readily inserted in and removed therefrom. The end portions of the frame, including the transverse members 23, 24, 26, 29 and 30, the vertical members 22 and the offset horizontal member 28, constitute tire guards adapted to engage, support and protect the outer periphery of the tire or tires inserted in the space surrounding the receptacle.

While I have shown the receptacle and its holder made as separate parts, it is obvious that the receptacle may be made as an inseparable part of the structure of the holder without departing from the spirit of my invention. With this fact in mind, it will be seen that the carrier, as a whole, comprises a receptacle surrounded by a space formed to receive an annular body, such as an automobile tire, and means for securing one or more tires in said space. The tire supporting means, as here shown, comprise the portions of the frame or cage which extend beyond the ends and below the bottom of the receptacle compartment, and in addition thereto, straps 42 43 provided with buckles, and adapted to surround portions of the tire or tires and adjacent portions of the frame or cage, as shown in Fig. 2. An adequate support for the inner periphery of the tire is provided by the portions of the carrier which constitute the receptacle holder, so that the receptacle holder alone may be relied upon as the support for the tire or tires in conjunction with suitable tire confining means, such as straps 42, these straps engaging members of the receptacle container, and passing around the tire or tires. I deem it preferable, however, to provide the carrier with extensions beyond the ends of the receptacle holder, said extensions providing bearings for the inner side of the inner tire, such as are afforded by the end portions of the horizontal members 16, 17, 19, 20 and 21. The said back extensions are also useful in supporting the end or guard portions formed by the transverse members 23 24 and 26 and the parts connecting said members, these being adapted to bear on the outer periphery of the tire or tires which are stored in the space surrounding the receptacle.

My invention is not limited to the form and construction of carrier here shown, this being selected by me for the purpose of illustration, and as showing the best embodiment of my invention at present known to me. Within the scope of the appended claims, various changes and modifications may be adopted not inconsistent with the general nature and purposes of my invention and without departing from the spirit thereof.

Having thus explained the nature of my said invention and described a way of constructing and using the same, although without attempting to set forth all of the forms in which it may be made, or all of the modes of its use, I declare that what I claim is:—

1. A carrier comprising a receptacle formed to enter an automobile tire, and provided with means for attachment to a support, said receptacle being surrounded by a tire-receiving space, and the said carrier having means for securing a tire in said space.

2. A carrier comprising a receptacle formed to enter an automobile tire, and provided with means for attachment to a support, said receptacle being surrounded by a tire-receiving space, and the said carrier having means for supporting the inner side of a tire inserted in said space.

3. A carrier comprising a receptacle formed to enter an automobile tire, and provided with means for attachment to a support, said receptacle being surrounded by a tire-receiving space, and the said carrier having means for supporting the inner side and the outer periphery of a tire inserted in said space.

4. A carrier comprising a back provided with means for attachment to a support, a receptacle holder projecting outwardly from the back, and formed to enter an automobile tire, and tire guards projecting from the back, and separated from the holder by a tire-receiving space.

5. A carrier having supporting means adapted to hold an annular body, such as an automobile tire, supporting means adapted to hold a receptacle within the space bounded by the annular body, and means for attachment to a support.

6. A carrier comprising a back provided with means for attachment to a support, and supporting members projecting from the back, said members being formed to hold an annular body, such as an automobile tire, and to hold a receptacle within the space bounded by the annular body.

In testimony whereof I have affixed my signature, in presence of two witnesses.

JOSEPH J. BOND.

Witnesses:
C. F. BROWN,
P. W. PEZZETTI.